United States Patent [19]

West et al.

[11] 4,109,698
[45] Aug. 29, 1978

[54] MACHINE FOR INSTALLING GIANT TIRES ON ONE-PIECE RIMS

[76] Inventors: Vallie D. West, 724 N. Washington; Jesse Kennedy, 201 S. Illinois, both of Du Quoin, Ill. 62832

[21] Appl. No.: 797,997

[22] Filed: May 18, 1977

[51] Int. Cl.² .............................................. B60C 25/06
[52] U.S. Cl. ...................................................... 157/1.2
[58] Field of Search .................. 157/1.1, 1.17, 1.2, 157/1.26, 1.28

[56] References Cited

U.S. PATENT DOCUMENTS

| | | | |
|---|---|---|---|
| 2,597,268 | 5/1952 | Simpson | 157/1.1 |
| 2,647,564 | 8/1953 | Douglass | 157/1.2 |
| 3,972,363 | 8/1976 | West et al. | 157/1.26 |

Primary Examiner—Al Lawrence Smith
Assistant Examiner—James G. Smith
Attorney, Agent, or Firm—Gravely, Lieder & Woodruff

[57] ABSTRACT

A machine for installing a giant tire on a one-piece rim includes a force unit, a guide cone having large and small ends, the former of which connects with the rim, and a clamping unit for holding the guide cone with the rim attached to its large end in a firm position against the force unit. The force unit has an upright frame and maneuvering cylinders positioned on the frame so as to be located generally around the small end of the cone when the cone is against the force unit. The small end of the cone is small enough to fit into the center of the tire, while the large end is about the same diameter as the outside diameter of the flanges on the rim so that the large end forms a gentle approach over the rim flange against which it is positioned. A portion of the guide cone behind the large end is cut away to form a relief which opens downwardly. The tire to be installed on the rim is first placed over the small end of the cone and the small end is clamped against the force unit. Then the portion of the tire sidewall located farthest from the relief is forced over the large end of the cone with one of the maneuvering cylinders, while the opposite portion is accommodated in the relief. This permits the portion farthest from the relief to pass over the flange and into the dropped center of the rim. Next the remaining portions of the sidewall are forced over the large end of the cone and the adjacent rim flange with the remaining maneuvering cylinders.

17 Claims, 9 Drawing Figures

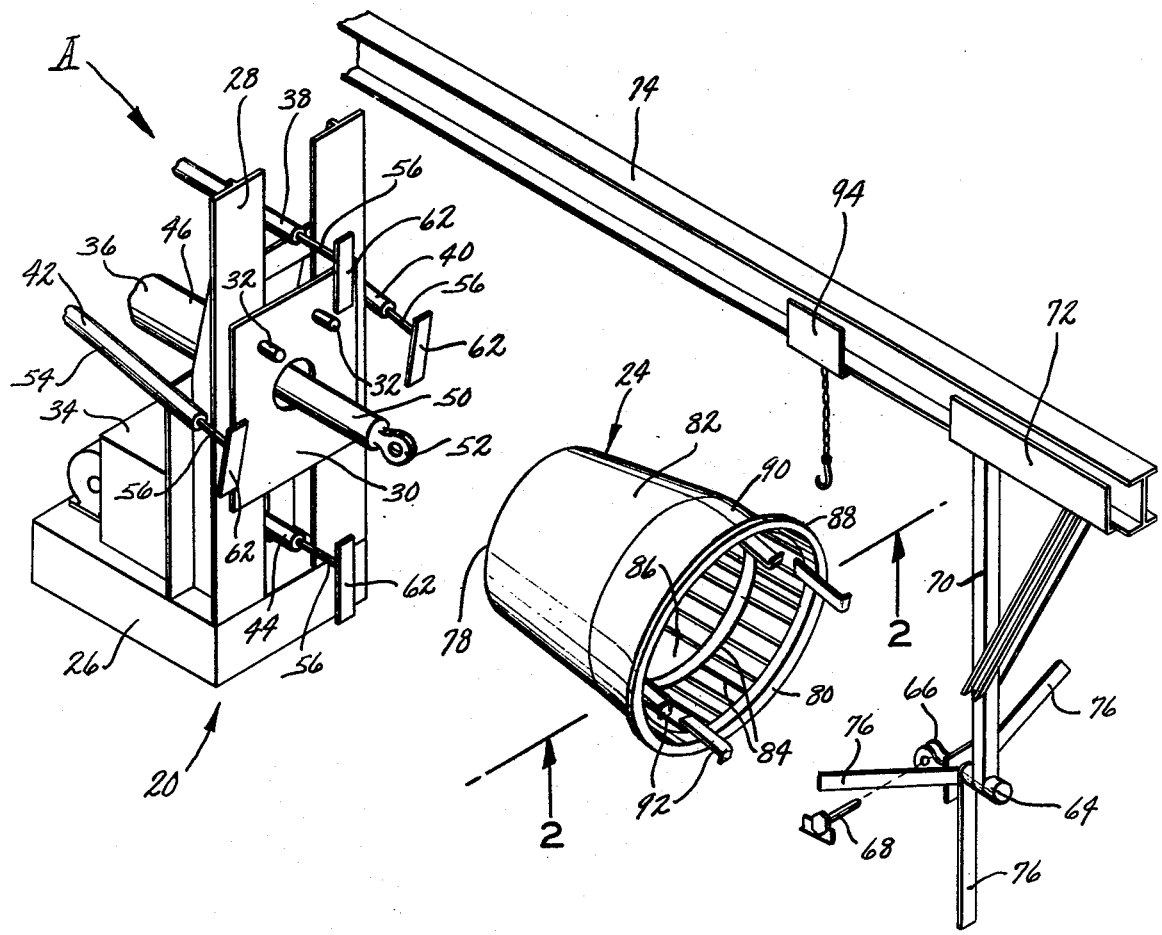
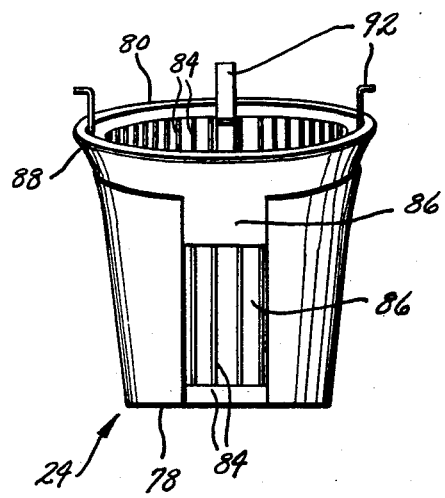
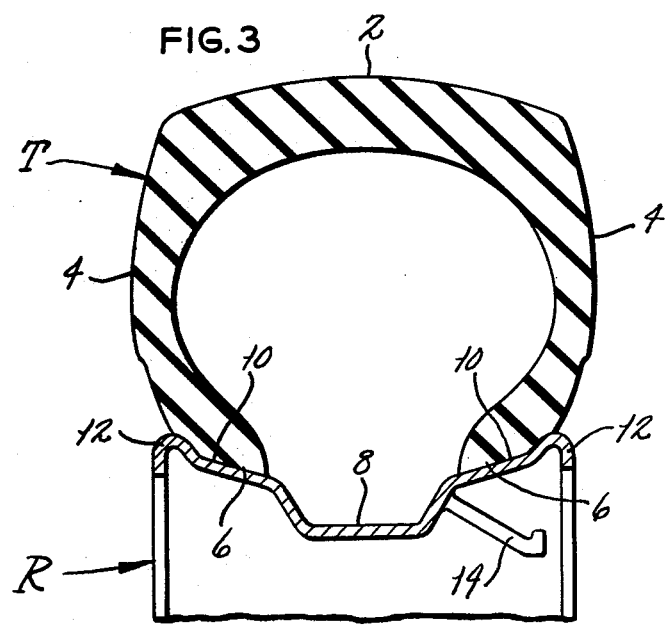

MACHINE FOR INSTALLING GIANT TIRES ON ONE-PIECE RIMS

BACKGROUND OF THE INVENTION

This invention relates in general to tire changing equipment, and more particularly to a machine for installing giant tires on one-piece rims.

Much of the heavy off-the-road transport equipment, such as the tractors and the trucks used at mines and quarries or the large machines used for earth excavations, utilize so-called giant tires which are large pneumatic tires of the tubeless variety. These tires may range up to 9 feet in diameter and when mounted on their rims weigh over a ton each. The rims alone usually measure in excess of four feet in diameter.

The most common rim for giant tires consists of five basic components which are separable, namely a rim base, a bead seat ring fitted over one side of the rim base, a side flange fitted over the bead seat ring, another side flange fitted over the rim base itself, and a lock ring to hold the bead seat ring in place on the rim base. The five-piece construction enables the rim to be disassembled so that it may be reassembled within a giant tire with relative ease. On the other hand, the multiple components often result in the mismatching of parts on reassembly, and much worse render the mounting quite susceptible to leakage. In this regard, an O-ring must be fitted between the rim base and the bead seat ring to prevent the pressurized air from escaping between the two, but it is not uncommon to have this seal installed improperly or to have it damaged during installation. As a consequence, a slow leak develops, resulting in costly downtime for an expensive piece of equipment.

One-piece rims are now available for installation in giant tires which are manufactued with slight modifications to accommodate such rims. While these rims, which are known as one-piece drop-center rims, eliminate the leakage problems, they present problems of a different character, the most significant of which is the difficulty in mounting. Due to their extreme weight and large size, these tires are extremely difficult to manipulate over the one-piece rims. The problem is compounded by the fact that the side walls of such tires are quite thick and relatively rigid so they are not easily maneuvered over the flanges on the one-piece rims.

SUMMARY OF THE INVENTION

One of the principal objects of the present invention is to provide a machine which is capable of installing a giant tire on a one-piece drop-center rim in matter of minutes and with a minimum amount of manual labor. Another object is to provide a machine of the type stated which is simple in construction and extremely durable. A further object is to provide a machine of the type stated which greatly minimizes the chance of damaging the giant tires or the rims during installation. An additional object is to provide a machine of the type stated which may also be used for breaking the beads on sidewalls of giant tires away from bead seats of multipiece rims on which those tires are installed. These and other objects and advantages will become apparent hereinafter.

The present invention is embodied in a machine including a tapered guide, the large end of which is positioned against the flange along the end of a tire rim, and means for maneuvering a tire over the guide and onto the rim. The invention also consists in the parts and arrangements and combinations of parts hereinafter described and claimed.

DESCRIPTION OF THE DRAWINGS

In the accompanying drawings which form part of the specification, and wherein like numerals and letters refer to like parts wherever they occur:

FIG. 1 is a perspective view of the tire installing machine of the present invention with the major components thereof separated;

FIG. 2 is a bottom view of the guide cone taken along line 2—2 of FIG. 1;

FIG. 3 is a sectional view of a giant tire mounted on its rim;

DETAILED DESCRIPTION

Figure 4:
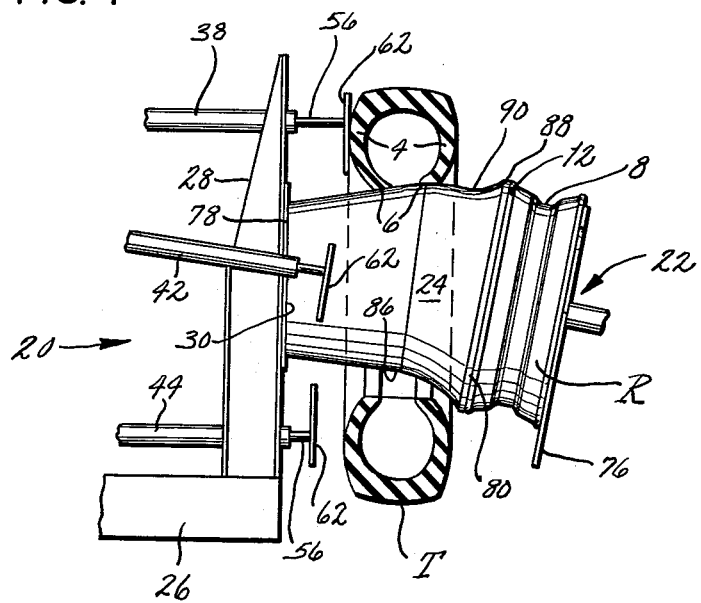
FIGS. 4–9 are elevational views of the tire installing machine with the major components of it clamped together and showing sequentially the steps for installing the giant tire on a rim.

Referring now to the drawings, A designates a machine (FIG. 1) for mounting a giant tire T (FIG. 3) on a one-piece drop-center rim R. The tire T has a tread 2, a sidewall 4 on each side of the tread 2, and sealing beads 6 along the inner margins of the sidewalls 4. The rim R, on the other hand, includes a dropped or depressed center portion 8, a bead seat 10 on each side of the center portion 8 and flanges 12 at the outer ends of the bead seats 10. The bead seats 10 are inclined at about 15° with respect to the axis of the rim R and are embraced by the sidewalls 4 such that the beads 6 on the sidewalls 4 bear tightly against the bead seats 10, forming air tight seals therewith. The sidewalls 4 along their inner margins abut against the flanges 12 which confine the sidewalls 4 in the lateral direction. Finally, the dropped-center portion 8 on the rim R has mounting lugs 14 attached firmly to it for attaching the rim R to a wheel.

The machine A is actually the machine of U.S. Pat. No. 3,972,363 issued Aug. 3, 1976, modified by the addition of various components to it. The machine of U.S. Pat. No. 3,972,363 breaks the beads on giant tires away from their bead seats on five-piece rims so that such rims may be disassembled and removed from their tires. As modified, the machine has the further capability of installing giant tires on one-piece rims. Thus, the machine A has the capability of serving two purposes. The machine A basically includes (FIGS. 1 and 4) a force unit 20 for applying forces to a giant tire T in order to maneuver the tire T onto the rim R, a clamping unit 22 which holds the rim R in place as the tire T is maneuvered over it, and a guide cone 24 over which the tire T is advanced as it is maneuvered onto the rim R.

The force unit 20 includes (FIG. 1) a base 26 having an upright frame 28 attached to it and this frame 28 in turn carries a forwardly presented positioning plate 30. The plate 30 has a pair of support members 32 projected horizontally from it, and these members are of circular cross section. The base 26 also mounts a hydraulic motor and pump unit 34 which is located behind the frame 28. The pump unit 34 supplies pressurized hydraulic fluid to five hydraulic cylinders, namely a centrally disposed clamping cylinder 36, an upper maneuvering cylinder 38, left and right maneuvering cylinders 40 and 42, and a lower maneuvering cylinder 44.

The center cylinder 36 has a barrel 46, which at its forward end is attached to the frame 28, and the barrel 46 contains a piston rod 50 which terminates at a coupling eye 52. The rod 50 projects forwardly through a center hole in the positioning plate 30, and when the barrel 46 is pressurized by the motor and pump unit 34, it is capable of extending the eye 52 a substantial distance beyond the positioning plate 30.

Each of the maneuvering cylinders 38, 40, 42, and 44 is identical and includes a barrel 54 and a piston rod 56 which is extended from and retracted into the barrel 54 by pressurized hydraulic fluid supplied to the barrel 46 by the motor and pump unit 34. The barrel 54 of the upper cylinder 38 is disposed between the two uprights of the frame 28 directly above the center cylinder 36. The barrel 54 of the lower cylinder 44, on the other hand, is attached to the base 26 directly below the center cylinder 36. The barrels 54 for the left and right cylinders 40 and 42 are secured firmly to upright frame 28. The piston rod 56 of each maneuvering cylinder 38, 40, 42, and 44 at its free or forward end is fitted with a pressing shoe 62 which is curved slightly to match the contour of the side walls 4 of the tire T. The barrel 54 on each cylinder 38, 40, 42, and 44 is set sufficiently rearwardly to enable the shoes 62 to be retracted generally to positioning plate 30. Moreover, the spacing between the pressing shoes 62 on the left and right cylinders 40 and 42 and between the shoes 62 on the upper and lower cylinders 38 and 44 is generally equal, with that distance being such that all four shoes 62 will be located opposite the rearwardly presented sidewall 4 on the tire T when the tire T is centered with respect to the center cylinder 36. The shoes 62 swivel with respect to the piston rods 56 of their respective cylinders 38, 40, 42, and 44, and this enables them to abut facewise against the sidewall 4 of a tire T even though the tire T is at an angle with respect to the positioning plate 30. The cylinders 36, 38, 40, 42, and 44 are operated individually from a control console on the frame 28.

The clamping unit 22 includes (FIG. 1) a center spindle 64 having a clevis 66 attached to its one end, and the clevis is configured to receive the coupling eye 52 on the forward end of the piston rod 50 for the center cylinder 36 so that the two may be coupled together with a clevis pin 68. The spindle 64 at its other end connects with a supporting frame 70 which is suspended from a trolley 72 that rolls along an overhead rail 47, so as to enable the clamping unit 22 to move toward and away from the force unit 20. It may also be supported on a dolly that rolls along the floor. The clamping unit 22 further includes three arms 76 which are welded to the spindle 64 and radiate from it at 120° angles. The arms 76 are longer than the radius of the rim R so that when the clamping unit 22 is brought against the forward end of the rim R, its arms 76 will bear against the flanges 12 on that end and will serve as a backing for the rim R. Moreover, the connection between the spindle 64 and the supporting frame 70 is such that the spindle 64 can rotate relative to the frame 70. The arms 76 of the clamping unit 22, when connected to the piston rod 50 of the center cylinder 36 serve as a backing for the rim R as a tire T is forced over the arm R with the maneuvering cylinders 38, 40, 42, and 44.

The cone 24 fits between the rim R and the positioning plate 30 on the force unit 20 and serves as a guide surface for directing the tire T onto the rim R as forces are applied to the tire T by the maneuvering cylinders 38, 40, 42, and 44 (FIGS. 4–9).

The cone 24 (FIGS. 1 and 2) is of tubular construction and is truncated, having a small end 78 and a large end 80, the former of which is of a lesser diameter than the diameter of the sealing beads 6 on the sidewalls 4 of the tire T, while the latter about equals the ouside diameter for the flanges 12 of the rim R. Nevertheless, the small end 78 is large enough to fit over the two support members 32 projected from the positioning plate 30 of the force unit 20. While both ends 78 and 80 lie in separate planes, the two planes are not parallel, but instead are located at a slight angle with respect to each other. The cone 24 is essentially composed of a smooth external skin 82 and internal ribbing 84 to which the skin 82 is attached. The ribbing 84 extends in both the circumferential and axial directions. Along the underside of the cone 24, that is, in the direction in which the planes of the two ends 78 and 80 converge, the skin 82 and ribbing 84 are interrupted to provide a downwardly opening cutout or relief 86 which extends from the small end 78 for approximately three-fourths the length of the cone 24. The taper of the portion of the skin 82 in which the relief 86 is located is quite small and constant (FIG. 4). However, at the underside of the cone 24, the portion of the skin 82 between the forward end of the relief 86 and the large end 80 of the cone 24 is at a significantly greater taper. In contrast, at the topside of the cone 24, the skin 82 tends to level out at a taper of lesser magnitude than the taper leading away from the small end 78 and then undergoes a significant increase in taper with the portion of the skin 82 leading up to the large end 80 being at about the same taper as the similar portion on the underside of the cone 24. The area of greatest taper on the skin 82, that is, the area leading up to the large end 80, forms a lip 88 on the end of cone 24, and that lip has a diameter only slightly greater than the outside diameter of the flanges 12 on the rim R. The leveled out portion on the top side of the skin 86 creates a slight valley or land 90 immediately ahead of the lip 88, but due to the inclination of the large end 80 with respect to the small end 78, the land 90 is less pronounced at the sides of the cone 24 and is practically indiscernible near the underside of the cone 24. Finally, the ribbing 84 at the large end 80 of the cone 24 has connecting lugs 92 (FIGS. 1 and 2) projected from it perpendicular to the plane of the large end 80. The connecting lugs 92 are arranged to align with the mounting lugs 14 on the rim R and furthermore have threaded holes at their ends so that bolts may be run through the rim mounting lugs 14 and threaded into the cone connecting lugs 92 to secure the rim R firmly against the large end 80 of the cone 24. When the rim R is so disposed, the lip 88 leads up to one end of the rim R, providing a smooth transition over the abrupt flange 12 at that end of the cone 24.

OPERATION

To install the giant tire T on the one-piece rim R, the rim R is first secured to the large end 80 of the cone 24. This is accomplished by aligning the mounting lugs 14 of the rim R with the connecting lugs 92 of the cone 24 and then extending bolts through the former and threading them into the latter. When the rim R is so positioned, the flange 12 at its one end will abut against the large end 80 of the cone 24 with the lip 88 on the cone 24 forming a smooth transition up to the outer margin of the adjacent flange 12. Next, the cone 24 and the rim R attached to it are lifted upwardly and the small end 78 of the cone 24 is inserted through the tire T. The cone 24 is easily lifted with a fork lift truck, and may also be lifted by a hoist 94 (FIG. 1) supported on the overhead rail 74. Also, the skin 82 of the cone 24 is covered with a suitable lubricating medium.

Once the cone 24 is within the tire T, the cone 24 is moved toward the force unit 20 with its small end aligned with the two horizontal support members 32 which project from the positioning plate 30. Indeed, the cone 24 is advanced over the support members 32 until its small end 78 abuts against the positioning plate 30 (FIG. 4). When the cone 24 is so disposed, its large end 80 will be disposed at a slight angle to the vertical with the top portion of the large end 80 being located somewhat ahead of the lower portion so that the planes of the two ends 78 and 80 converge downwardly. The cone 24 along with the rim R and tire T are temporarily supported in this position by means of the overhead hoist 94.

Thereafter, the cone 24 is secured firmly against the force unit 20 by means of the clamping unit 22, this being achieved by moving the clamping unit 22 forwardly on its trolley 72 until its arms 76 bear against the flange 12 on the front end of the rim R. The piston rod 50 of the center cylinder 26 is also extended and its coupling eye 52 is brought into the clevis 66 on the clamping unit 22 so that the clevis pin 88 may be inserted through the eye 52 and clevis 66 to secure the two together. Thereupon, the piston rod 50 is retracted sufficiently to clamp the rim R and cone 24 tightly between the arms 76 and the positioning plate 30 of the force unit 20.

Figure 5:
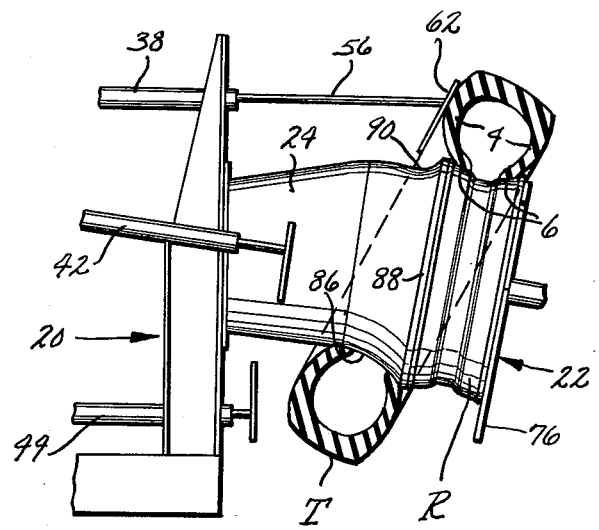

With the rim R and cone 24 secured firmly against the force unit 20, the maneuvering cylinders 38, 40, 42, and 44 are operated to maneuver the tire T over the cone 24 and into the channel-shaped portion of the rim R between the flanges 12 thereof. In particular, the upper cylinder 38, as well as the left and right cylinders 40 and 42 are energized to bring their pressing shoes 62 against the rearwardly presented sidewall 12 of the tire T (FIG. 4). When the forwardly presented sidewall 4 reaches the lip 88 on the cone 24, the left and right cylinders 40 and 42 are retracted to back off their pressing shoes 62. The upper cylinder 38, however, continues to advance its pressing shoe 62, and indeed, the shoe 62 is moved forwardly enough to force both sealing beads 6 at the top of the tire T over the lip 88 and beyond the flange 12 at the lip 88 (FIG. 5). In other words, the sealing beads 12 and the sidewalls 4 on which they are located drop into the channel between the two flanges 12 on the rim R. The sidewalls 4 along the side and bottom of the tire T remain outside of the rim R and consequently are cocked at a substantial angle with respect to the rim R. In fact, the beads 6 on the lower portions of the two sidewalls 4 extend through the forward end of the relief 86 in the cone 24.

Figure 6:
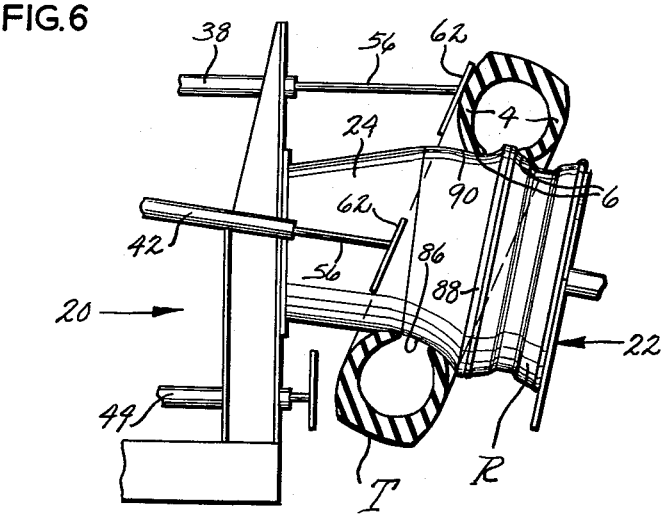
Figure 7:
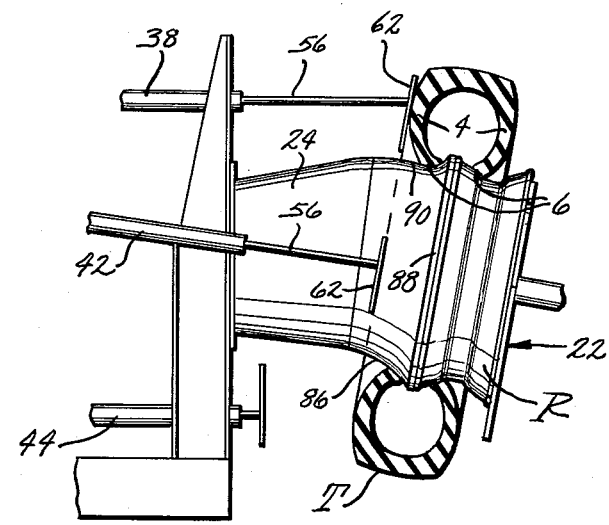
Figure 8:
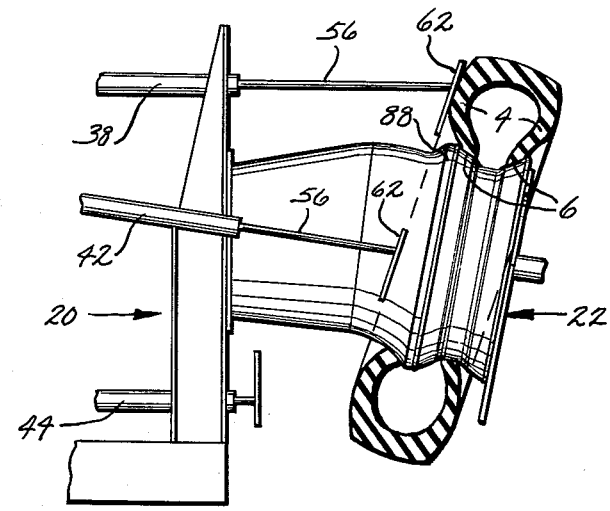

Next, the center cylinder 36 is backed off sufficiently to enable the rearwardly presented sidewall and sealing bead 6 thereon to move rearwardly over the flange 12 and onto the adjacent lip 88 so as to again be completely around the cone 24 (FIG. 6). In this regard, the pressing shoe 62 of the upper cylinder 38 is backed off just enough to enable the rearmost bead to locate around the land 90 on the cone 24. With the shoe 62 of the upper cylinder 36 maintained in a fixed position, the piston rods 56 of the left and right cylinders 40 and 42 are advanced alternately in strokes not exceeding 3 to 6 inches. This works the sealing bead 6 of the forwardly presented sidewall 4 over the lip 88 and into the channel-shaped portion of the rim R. When the side portions of the sidewall 4 passes over the lip 88 and flange 12, the bottom of this sidewall 4 usually follows as a result of the continuing force applied to the sidewalls 4 by the left and right cylinders 40 and 42 (FIG. 7). However, if the lower portion of the forwardly presented sidewall 4 does not immediately follow, the lower maneuvering cylinder 44 should be energized so that its pressing shoe 62 will exert a force against the lower portion of the forwardly presenting sidewall 4 so as to force the bead 6 on that portion over the lip 88 and flange 12, enabling it to likewise drop into the channel between the two flanges 12. In this regard, the forwardly presented sidewall 4 is moved onto the rim R by a force exerted against the rearwardly presented sidewall 4 primarily through the cylinders 40 and 42, and sometimes this force is of sufficient magnitude to collapse the tire in the lateral direction and bring the two sidewalls 4 thereof together.

Figure 9:
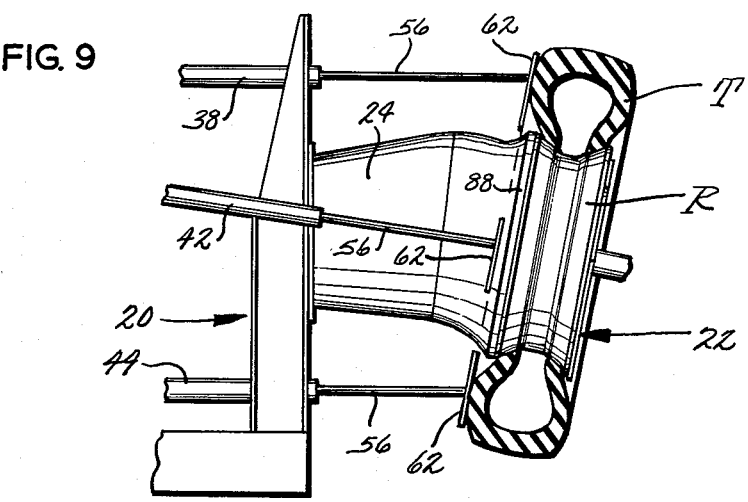

After the forwardly presented sidewall 4 is moved onto the rim R, the same procedure is repeated for the rearwardly presented sidewall 4. More specifically, the upper cylinder 36 is again energized to move the bead 6 on the rearwardly presented sidewall 4 over the lip 88 and adjacent flange 12 until that bead locates in the dropped central portion 8 of the rim R. When so disposed, the lower portion of the bead 6 will be located in the relief 86 at the bottom of the cone 24. Next, the left and right cylinders 40 and 42 are energized alternately to force the side portions of the sealing beads 6 on the rearwardly presented sidewall 4 over the lip 88 and the adjacent flange 12. Usually this is enough to bring the lower portion of the rear sidewall 4 also over the lip 88 and into the rim R, but if it isn't, then the lower cylinder 44 is energized to achieve this end (FIG. 9).

After the sidewalls 4 are over the rim R, the rim R and tire T are removed from the machine A by extending the piston rod 50 of the central cylinder 36 slightly to release the force on the clevis pin 68, which is thereupon removed. Then the clamping unit 22 is withdrawn followed by the attached rim R and cone 24. Next, the bolts which connect the rim R and cone 24 are removed and the tire T is inflated with air. Normally, to seat the beads 6 against the bead seat 10 of the rim R, a chain or band must be placed around the tire T. When contracted, this band causes the sidewalls 4 to move laterally a sufficient distance to bring the sealing beads against the tapered bead seats 10. Once air is introduced into the tire T, it forces the sidewalls 4 outwardly still further until they are restrained by the flanges 12 on the rim R.

This invention is intended to cover all changes and modifications of the example of the invention herein chosen for purposes of the disclosure which do not constitute departures from the spirit and scope of the invention.

We claim:

1. A machine for installing a tire on a rim having flanges at its ends and a channel-shaped portion between the flanges, said machine comprising: a frame; a tapered guide having a large end which corresponds generally in diameter to the outer diameter of a flange on a flanged rim and a small end which is small enough to fit into a tire to be mounted on the rim; means for positioning the guide in a fixed position with respect to the frame and for securing the guide against the rim with the large end of the guide aligned with one of the flanges on the rim such that the large end of the guide forms a tapered approach to the periphery of that flange; and first, second and third fluid operated cylinders on the frame, each cylinder having a pressing shoe that is independent of other pressing shoes and moves generally along, but slightly outwardly from, the tapered surface of the guide and is further positioned such that it will bear facewise against the sidewall of the tire positioned around the guide, the first cylinder being located intermediate the second and third cylinders so that the shoes on the second and third cylinders will bear against the sidewall of the tire to the sides of the location at which the shoe for the first cylinder bears against the sidewall; whereby the cylinders maneuver the tire over the tapered guide and onto the rim such that the inner margins of the sidewalls are between the flanges on the rim.

2. A machine according to claim 1 wherein the tapered guide is relieved sufficiently intermediate its ends for a limited distance in the circumferential direction to create a relief that will receive a portion of the tire along the inner margins of its sidewall while an opposite portion of the sidewall is between the two flanges on the rim.

3. A machine according to claim 2 wherein the guide at its large end has a lip of greater taper than the remainder of the guide.

4. A machine according to claim 2 wherein the large and small ends of the guide define planes which converge and the relief is on that portion of the guide presented toward the region of convergence for the two planes.

5. A machine according to claim 4 wherein the guide has a land presented in the direction in which the planes diverge, with the land being located intermediate the ends and being of lesser taper than the portions of the guide located in front and behind it.

6. A machine according to claim 2 wherein the first cylinder operates along that portion of the guide which is located furthest from the relief.

7. A machine according to claim 2 wherein the means for positioning the guide, clamps the tapered guide against the frame and the rim against the large end of the tapered guide.

8. A machine according to claim 7 wherein the means for positioning the guide comprises a clamping member that bears against that end of the rim located away from the large end of the guide and means for urging the clamping member toward the frame.

9. A machine according to claim 8 wherein the means for urging the clamping member is mounted on the frame and is connectable with the clamping member, the means for urging the clamping member exerting its force through the interior of the rim and guide.

10. A machine according to claim 9 wherein the frame has an upright positioning surface against which the guide is positioned, and the means for urging the clamping members is a fluid operated cylinder which moves generally perpendicular to the upright surface.

11. A machine for installing a giant tire on a one-piece rim having outwardly directed flanges along its ends and bead seats leading up to the flanges, the tire having sidewalls and sealing beads along the inner margins of the sidewalls with the sidewalls being laterally confined by the rim flanges and the sealing beads bearing against the tapered bead seats when the tire is mounted on the rim, said machine comprising: a generally tapered guide having a small end and a large end with the small end being sized to fit through the bead seats of the tire and the large end being adjacent to a tapered surface on the guide and being about the same diameter as the outside diameter on one of the rim flanges, so that the large end, when aligned with and brought against said one flange, forms a gentle approach to the space between the two flanges on the rim, the guide having a relief which opens laterally therefrom with the relief being sized and positioned such that it will accommodate a portion of the sealing bead on one of the tire sidewalls when the rim is against the guide and the opposite portion of the sealing bead for the same sidewall is between the two flanges of the rim; a frame; means for holding the tapered guide in a fixed position with/respect to the frame and for positiong the rim firmly against the large end of the tapered guide with the large end of the guide aligned with said one flange on the rim so that the large end of the guide forms a tapered approach to the periphery of said one flange; and maneuvering means on the frame for urging the tire over the guide and onto the rim such that the beads are around their respective bead seats.

12. A machine according to claim 11 wherein the maneuvering means comprises: at least one fluid operated cylinder positioned to exert a force against that sidewall of the tire which is presented toward the guide.

13. A machine according to claim 11, wherein the frame has a positioning surface against which the small end of the guide locates, and wherein the means for positioning the guide holds the small end of the guide against the positioning surface.

14. A machine according to claim 13 wherein the maneuvering means comprises: a first fluid operated cylinder positioned to exert a force on the sidewall of the tire in the region of said opposite portion of said sealing bead, a second fluid operated cylinder positioned to exert a force on the sidewall of the tire between the portion of the sealing bead at the relief and said opposite portion to one side of said opposite portion, and a third cylinder positioned to exert a force on the sidewall of the tire between the portion of the sealing bead at the relief and said opposite portion on the other side of said opposite portion.

15. A machine according to claim 14 wherein the first, second and third fluid operated cylinders are mounted on the frame.

16. A machine according to claim 13 wherein the means for positioning the guide includes a clamping member which bears against the flange on the end of the rim that faces away from the guide, and means for exerting a force on the clamping member with the force being exerted through the interior of the rim and the guide.

17. A machine according to claim 16 wherein the means for exerting the force on the clamping member includes a fluid operated center cylinder mounted on the frame and means for coupling the center cylinder with the clamping member.

* * * * *